United States Patent [19]

Friedlander et al.

[11] Patent Number: 5,053,985
[45] Date of Patent: Oct. 1, 1991

[54] RECYCLING DCT/IDCT INTEGRATED CIRCUIT APPARATUS USING A SINGLE MULTIPLIER/ACCUMULATOR AND A SINGLE RANDOM ACCESS MEMORY

[75] Inventors: Rami Friedlander; Rafi Retter, both of Haifa, Israel

[73] Assignee: Zoran Corporation, Santa Clara, Calif.

[21] Appl. No.: 424,079

[22] Filed: Oct. 19, 1989

[51] Int. Cl.$^5$ .............................................. G06F 7/38
[52] U.S. Cl. ................................................ 364/725
[58] Field of Search ............................... 364/725, 726

[56] References Cited

U.S. PATENT DOCUMENTS

| | | | |
|---|---|---|---|
| 4,791,598 | 12/1988 | Liou et al. | 364/725 |
| 4,797,847 | 1/1989 | Duhamel | 364/725 |
| 4,841,464 | 6/1989 | Guichard et al. | 364/725 |
| 4,849,922 | 7/1989 | Riolfo | 364/725 |
| 4,860,097 | 8/1989 | Hartnack et al. | 364/725 |

Primary Examiner—Dale M. Shaw
Assistant Examiner—Long T. Nguyen
Attorney, Agent, or Firm—Henry K. Woodward

[57] ABSTRACT

A discrete cosine transform/inverse discrete cosine transform or DCT/IDCT integrated circuit capable of performing both DCT and IDCT, includes a processor for processing DCT/IDCT data including, input buffer and arithmetic logic unit for processing incoming data and first pass processed data, multiplier and accumulator unit for performing mathematical operations on DCT/IDCT data, and output buffer and arithmetic logic unit for processing first pass processed data and outgoing data. Also provided is an interleaved random access memory for storing DCT/IDCT data during various stages of processing.

5 Claims, 4 Drawing Sheets

RECYCLING DCT/IDCT INTEGRATED CIRCUIT APPARATUS USING A SINGLE MULTIPLIER/ACCUMULATOR AND A SINGLE RANDOM ACCESS MEMORY

FIELD OF THE INVENTION

The present invention relates to performing DCT/IDCT in the compression and decompression of digital data. More specifically, the present invention relates to RAM utilization and processor formation in a DCT/IDCT device.

SUMMARY OF THE PRIOR ART

The use of DCT/IDCT in digital data decompression is well known in the art. DCT stands for discrete cosine transform and is used during the compression of digital data. In the normal compression of image data, an image is divided into eight by eight blocks of pixels. DCT, which is basically a sequence of multiplications and additions, is performed on the image data in two dimensions. First, DCT is performed across the rows of data. Second, DCT is preformed in columns on the results of the first, or row, DCT operation. Once two dimensional DCT has been performed, the DCT data is then operated on to form a compressed code of information which may be stored efficiently in memory or transmitted via telephone line or other media.

During the decompression stage, a similar process occurs. The process, however, is in a reverse order of that described above. Data is decoded and then the inverse of DCT, IDCT, is preformed, first in columns, then in rows, to recreate the original image. Both DCT and IDCT and the two dimensional processing of image data are well known.

During DCT and IDCT operations the data is scanned twice: once (first pass) the data is scanned in rows order, and the results are written to memory, and again (second pass) the results are scanned in columns order. If the required time to scan the data is T, then the two scans will require 2T. In order to save half of the process time two interleaved memories are required. During the first pass, while reading from the first memory, the results are written to the second one, and during the second pass, while reading from the second memory, the results are written to the first memory.

DCT on a row is preformed by multiplying each pixel of the row by a first predefined row of coefficients and then adding the total products for the row into a first resultant sum, R0. A second row of coefficients is then multiplied to the row of pixels and its products summed to obtain a second resultant R1. This process is repeated until the row is complete, and on each row until the eight by eight block is complete. For one result, it is necessary to calculate eight multiplications of eight data values with eight different coefficients, and then to sum the eight partial results. This results in a total of 64 multiplications in order to generate eight results. As is well known in the art, multiplications require a relatively large amount of time and componentry. For example, they require a period approximately five times that of addition and from a hardware standpoint require at least five times the integrated circuit area.

The problem of multipliers requiring relatively large amounts of integrated circuit area is compounded by the number of multipliers necessary to perform traditional multiplication. To complete one "pass," or produce one resultant, for example R0, eight multipliers and seven adders are required. Such a large number of mathematical components, particularly multipliers, demands a significant large amount of integrated circuit real estate.

SUMMARY OF THE INVENTION

Accordingly, it is an object of the present invention to provide a DCT/IDCT integrated circuit that requires only one RAM.

In is another object of the present invention to provide a DCT/IDCT integrated circuit which reduces the number of time consuming multiplications required to perform DCT or IDCT on image data.

It is another object of the present invention to provide a DCT/IDCT integrated circuit that optimizes the physical mathematical apparatus required to perform DCT and IDCT.

It is still another object of the present invention to provide a DCT/IDCT integrated circuit which shares common componentry between DCT and IDCT portions to promote efficiency in DCT/IDCT design.

Another object of the invention is to reduce the number of multiplications and thereby reduce the number of multipliers and reduce the circuit size and chip area.

The attainment of these and related objects may be achieved through use of the novel DCT/IDCT integrated circuit herein disclosed. A DCT/IDCT integrated circuit in accordance with this invention has a processor for processing DCT/IDCT data including, input buffer and arithmetic logic unit for processing and processing first pass processed data incoming data, multiplier and accumulator unit for performing mathematical operations on DCT/IDCT data, and output buffer and arithmetic logic unit for processing first pass processed data and processing outgoing data. Also provided is an interleaved random access memory for storing DCT/IDCT data during various stages of processing.

The attainment of the foregoing and related objects, advantages and features of the invention should be more readily apparent to those skilled in the art, after review of the following more detailed description of the invention, taken together with the drawings, in which:

DETAILED DESCRIPTION OF THE PREFERRED EMBODIMENT

INTERLEAVED RAM

Figure 1:
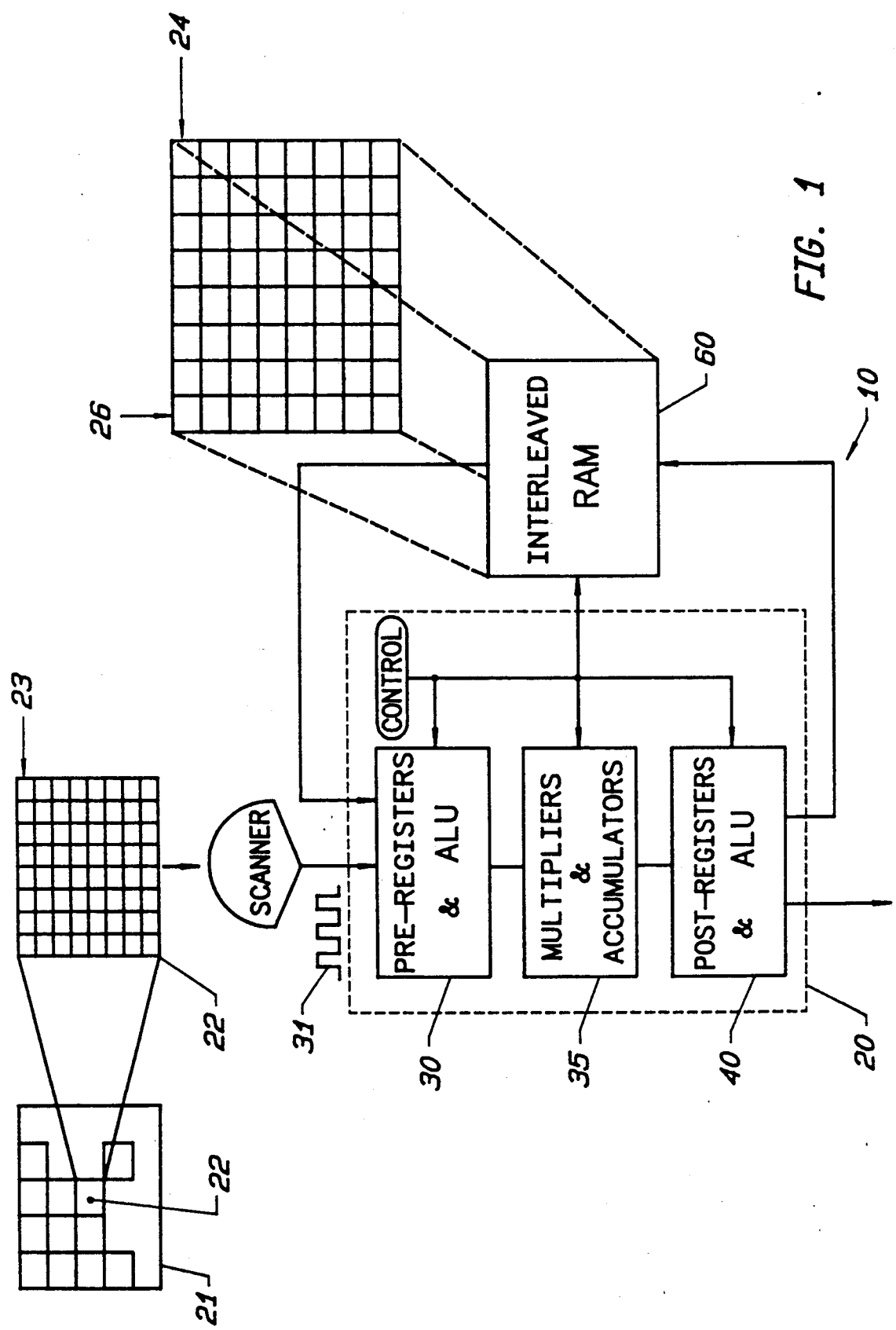
FIG. 1 is a block diagram of the DCT/IDCT integrated circuit of the preferred embodiment.

Referring to FIG. 1, a block diagram of the DCT/IDCT integrated circuit 10 of the preferred embodiment is shown. The circuit is primarily comprised of a processor 20 and an interleaved RAM 60. As described above, prior art DCT/IDCT arrangements require the use of two RAMs to complete two dimensional (or two pass) DCT processing. The present invention makes possible the use of only one RAM in two pass DCT/IDCT processing by (1) interleaving the manner in which data is stored in the RAM and (2) operating the processor 20 at twice the rate at which data is being clocked into (and out of) the DCT/IDCT device 10.

When data from an image 21 is to be compressed, the image 21 is divided into a plurality of eight by eight pixel blocks. Data for each block then undergoes DCT. Using block 22 as an example, DCT is performed on all of the data rows in the block 22. Row 23 is read first and processed by the DCT circuitry 30, 35 and 40. The result of the DCT processing for row 23 is stored in row 24 of the interleaved memory 60. The same procedure is performed on the other rows of block 22, in sequence, until RAM 60 contains the results of the first dimension (or first pass) of DCT on block 22.

The second dimension (or second pass) of DCT involves performing DCT on the columns of RAM 60, i.e., performing DCT on the temporary results. In this instance, a column of data, column 26 for example, is read from RAM 60 back into the processor 20. A second DCT operation is then performed on this data and the result is output from the device 10 for subsequent encoding. In accordance with one feature of the invention, the processor 20 has been designed to operate at twice the speed at which input data from block 22, or any other block, enters the device 10.

Figure 2:
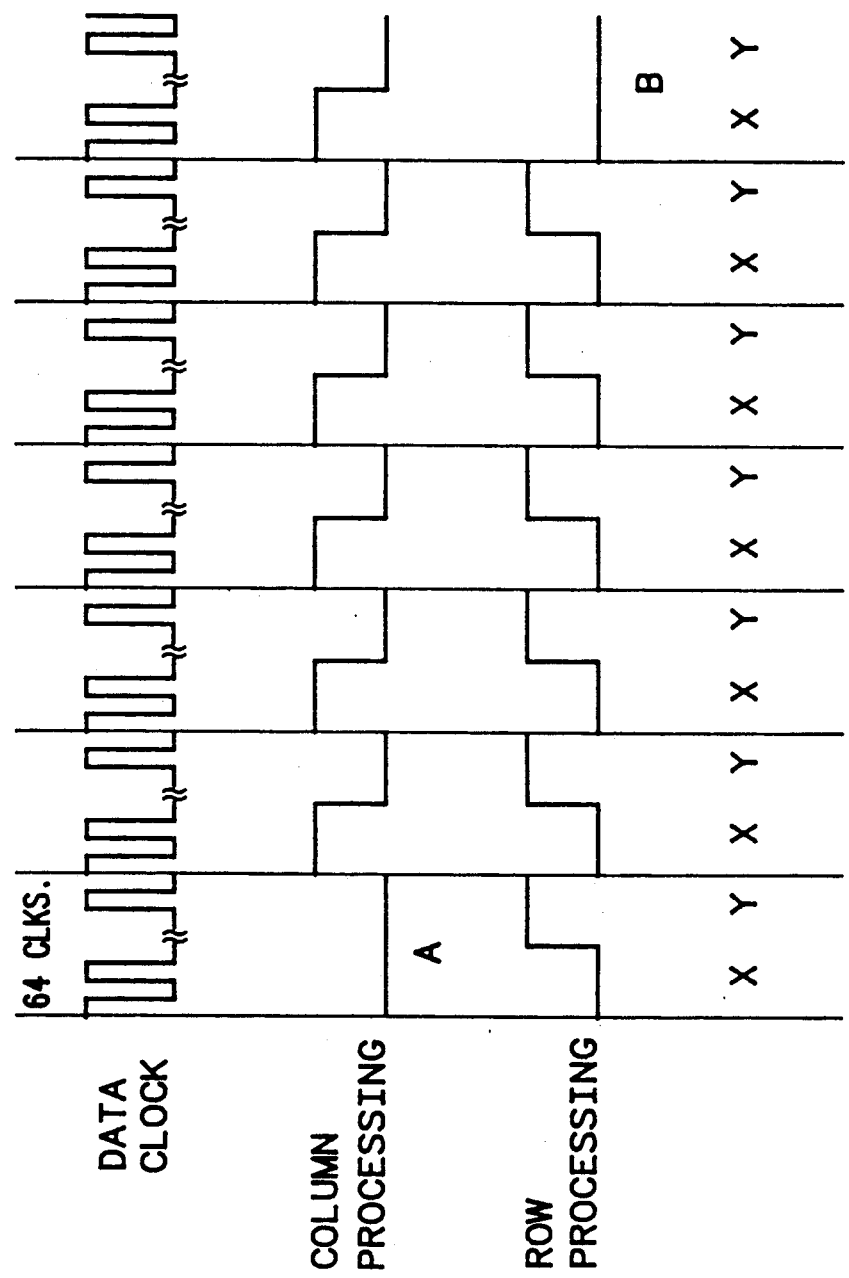
FIG. 2 is a timing diagram illustrating the operation of the processor with respect to incoming data clock for the preferred embodiment.

Referring to FIG. 2, a timing diagram, illustrating the operation of the processor 20 with respect to the input data clock 31 is presented. The timing diagram of FIG. 2 is made for a hypothetical situation where there are six eight by eight pixel blocks in image 21. Generally, speaking, for every input data clock pulse there are two clock pulses within the processor 20. During the first half X of the input data clock pulse, with the exception on the initial pulse A, data is read out of the RAM 60 to the processor 20 and the second dimension of DCT is performed. As the data is read out of RAM 60 that data does not need to be stored any more and the portion of RAM 60 that it resided in may be used for other purposes. During the second half Y of each input clock cycle, block 22 data is input to the processor 20, the first dimension of DCT is performed and the results are written in a row or column of RAM 60 (depending on whether row or column DCT is being performed in the first pass). This process is repeated until each block from image 21 has been processed. By operating the processor 20 at twice the speed of the input image data and loading new data in rows or columns as old data is readout, only one RAM 60 is needed. This results in substantial savings in integrated circuit area without significantly increasing time of processing and thereby increases the number of device which can be produced per die (or wafer).

To reiterate, it is possible to read (for second pass) and write (for first pass) from the same memory. This is achieved by running the read/write operations in twice the speed of the data, so for each data (that enters or leaves the chip) one read operation and one write operation are preformed. The new data is written in place of the old one in the interleaved memory 60.

Figure 3:
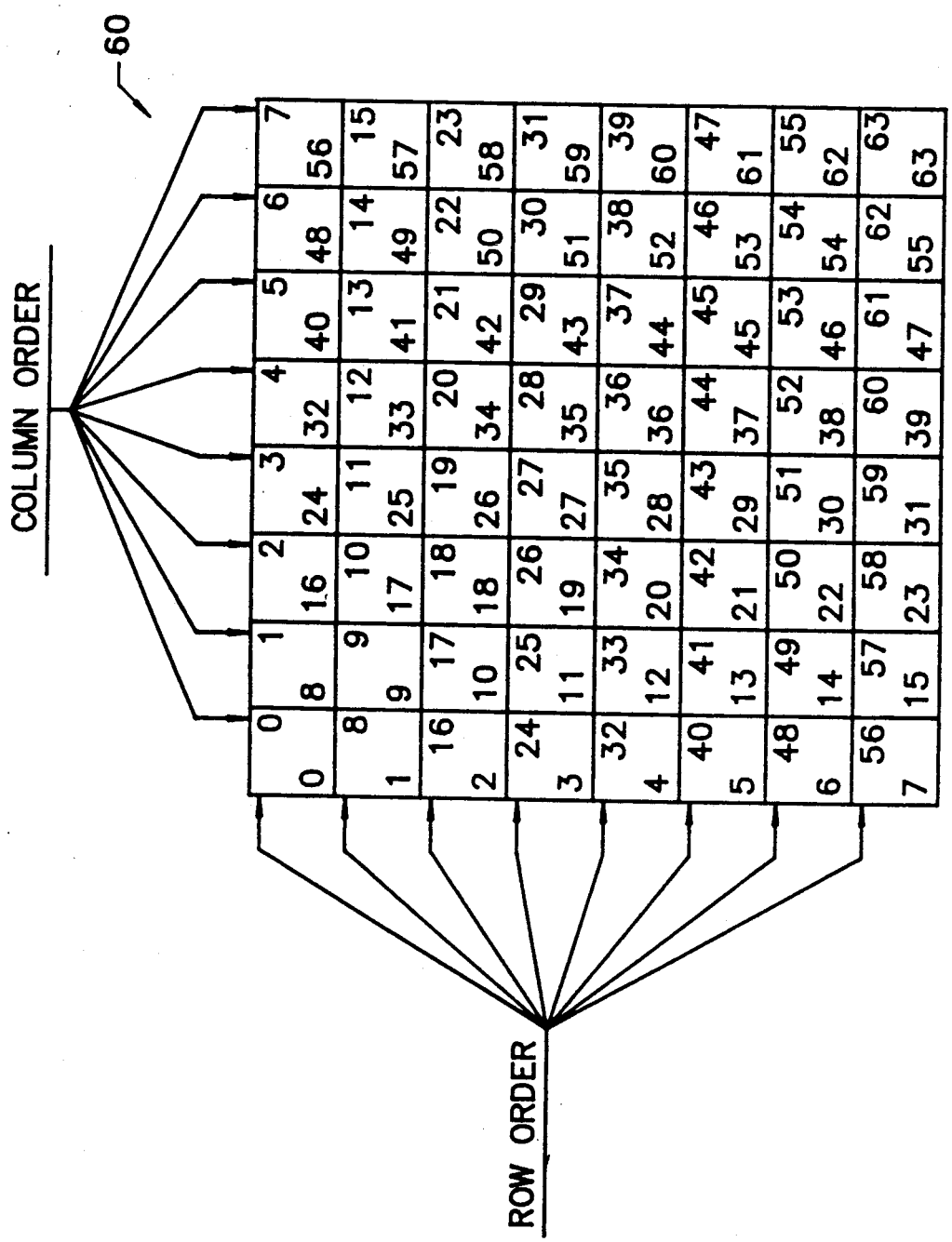
FIG. 3 illustrates the row and column addressing scheme of the interleaved transposition memory of the preferred embodiment.

Referring to FIG. 3, another problem is maintaining row and column order. During the first pass the data is written in row order and during the second pass those results are read in column order. The problem is that in the same time, while reading in column order, it is necessary to write new data in row order. The effect of this is achieved by writing the data in column order and reading it out in row order. That way, every data that is written in row order will be read in column order and every data that is written in column order is read in row order. To accomplish the appropriate reads and writes, the interleaved transposition memory 60 is labelled with addresses for rows and columns as indicated in FIG. 3.

Referring again to FIG. 2, the amount of time required to perform DCT on an image is N+1 block time frames, where N=the number of blocks 22 in the image 21. The 1 represents ½ of a block time frame at A and another half of the block time frame at B. At A there is an extra half of block time frame because during this first half of the block time frame X there is no data in RAM 60 to be processed. Similarly, at B, there is no new data to be read into the processor 20 during the second half Y of the clock pulse.

IDCT is fundamentally performed in the same manner as DCT, but in the opposite direction. An ordinary skilled artisan would be able to perform IDCT with the device 10 given the above description of DCT and common knowledge of IDCT. IDCT would, however, primarily use blocks 35 and 40 of FIG. 1, whereas DCT primarily uses blocks 30 and 35. After a first dimension of IDCT, the results are stored in RAM 60. A second dimension of IDCT is then performed and the results are output from the device 10.

SYMMETRIC/ANTISYMMETRIC PROPERTY

A second aspect of the present invention involves the symmetric and antisymmetric property of the coefficients used in DCT/IDCT. The following are the equations for DCT and IDCT:

DCT:
$$F_{(k)} = \frac{2}{N} C_{(k)} \sum_{j=0}^{N-1} f_{(j)} * \cos\left[\frac{(2j+1)k\pi}{2N}\right] k = 0, \ldots, N-1$$

IDCT:
$$f_{(j)} = \frac{2}{N} \sum_{k=0}^{N-1} C_{(k)} * F_{(k)} * \cos\left[\frac{(2j+1)k\pi}{2N}\right] j = 0, \ldots, N-1$$

where:
$$C_{(k)} = \begin{cases} \frac{1}{\sqrt{2}} & \text{for } k = 0 \\ 1 & \text{for } k = 1, \ldots, N-1 \end{cases}$$

The above equations use the following cosine coefficient tables, although other tables may be suitable for different sizes:

| D0 | 2896 | 2896 | 2896 | 2896 | 2896 | 2896 | 2896 | 2896 |
|----|------|------|------|------|------|------|------|------|
| D1 | 4017 | 3405 | 2275 | 799  | −799 | −2275| −3405| −4017|
| D2 | 3784 | 1567 | −1567| −3784| −3784| −1567| 1567 | 3784 |
| D3 | 3405 | −799 | −4017| −2275| 2275 | 4017 | 799  | −3405|
| D4 | 2896 | −2896| −2896| 2896 | 2896 | −2896| −2896| 2896 |
| D5 | 2275 | −4017| 799  | 3405 | −3405| −799 | 4017 | −2275|
| D6 | 1567 | −3784| 3784 | −1567| −1567| 378  | −3784| 1567 |

| -continued | | | | | | | |
|---|---|---|---|---|---|---|---|
| D7 | 799 | −2275 | 3405 | −4017 | 4017 | −3405 | 2275 | −799 |

As mentioned in the prior art, for each row it is necessary to calculate eight multiplications of eight data values with eight different coefficients, and then sum the eight partial results. This come to a total of 64 multiplications in order to generate 8 results. In the preferred embodiment, it is recognized that during DCT, each even row of coefficients is internally symmetrical and each odd row is internally antisymmetrical. It means that on each even row, we can add the eight data values symmetrically (D0+D7, D1+D6, D2+D5, D3+D4), multiplying the four sums with four coefficients and summing the four results. Thereby, only four multiplications are required instead of eight.

During IDCT the device 10 reads the Cosine Coefficients Table in column order. The coefficients inside the columns are not symmetrical or antisymmetrical, but each even coefficient is symmetrical between the columns and each odd coefficient is antisymmetrical between the columns. For example, the first coefficient of the first column (from left to right) is identical to the first coefficient of the last column. Therefore, multiplying D0 by the first coefficient of the first column gives two partial results: (1) to the first column and (2) to the last column. As a result of this property, the device 10 is configured to multiply the four even data values (D0, D2, D4 and D6), S0 is the sum of those four multiplications. Then four odd data values (D1, D3, D5 and D7) are multiplied, S1 is the sum of these four multiplications. The summation of S0 and S1 gives the first result F0 (same as eight multiplications by the first column), and the subtraction S1 from S0 gives the last result F7 (same as eight multiplications by the last column). In this manner, after eight multiplications, an addition and a subtraction, the two results are generated. Thus, the average number of multiplications per results is four, resulting in a total of 32 multiplications for the 8 results (instead of 64 multiplications originally).

Multiplier/Adder

Referring to FIG. 4, in addition to reducing the actual number of multiplications that must take place to produce the necessary DCT/IDCT results, it is possible to further reduce the integrated circuit area of a conventional multiplier/adder arrangement for DCT/IDCT purposes.

Figure 4A:
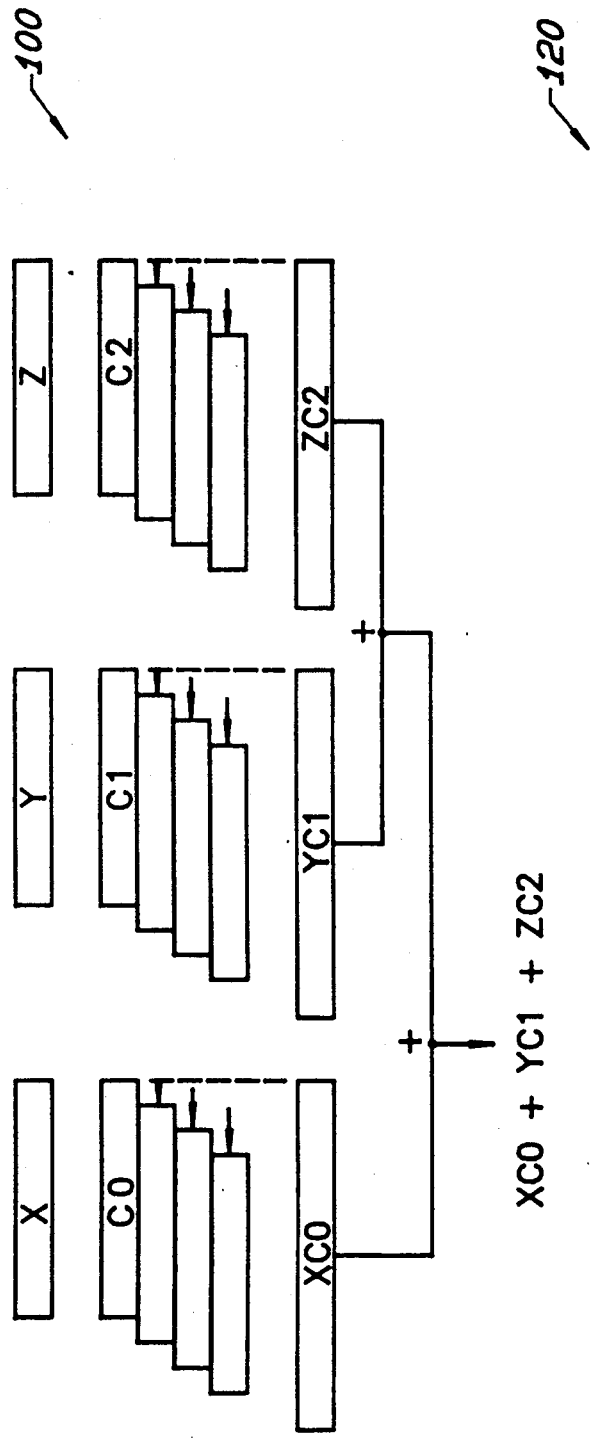
FIG. 4(a) and 4(b) are diagrammatical illustrations of the multiplier/adder of the preferred embodiment.

Referring to FIG. 4(a) a diagrammatic illustration of a conventional multiplier/adder arrangement 100 is shown. We will assume for purposes of illustration that X, Y and Z are four bit values and it is desirable to multiply these values to coefficients C0, C1 and C2, respectively, and sum the results. In multiplying X and C0 the least significant bit (LSB) controls the initial addition of C0; if the LSB is "1" then C0 is added and if the LSB is "0" then C0 is not added. C0 is then shifted left and the decision to add C0 is according to the next bit of X, and so on until all bits of x are used. This shift, addition process repeats itself until the coefficients have been shifted to the last bit of X, Y or Z. The results of the shifts and add are then added to produce XC0, YC1 and ZC2, which are the added to one another to produce the final result.

Figure 4B:
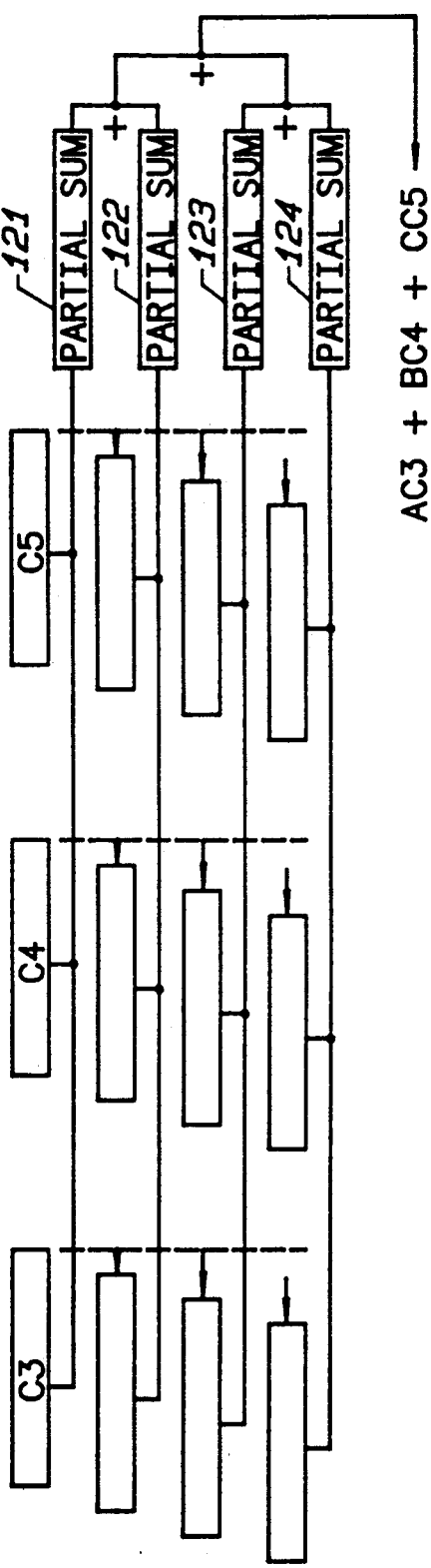

Referring to FIG. 4(b), the multiplier/adder 120 of the preferred embodiment obtains the same result, but reduces the required integrated circuit real estate by one half. The multiplier/adder 120 preforms this feat by creating partial sums between shifts and adding those partial sums. For instance, in FIG. 4(b) it is desired to multiply A, B and C and coefficients C3, C4 and C5, respectively, all four bit values (although other bit sizes could certainly be used) and sum the products. This accomplished by multiplying A and C3, B and C4 and C and C5 and then adding these sums to produce a first partial results 121. Each of the coefficients C3, C4 and C5 are shifted (indicated by the arrows) and again multiplied by A, B and C, respectively, to produce a second partial result 122. Since there are four bits in the coefficients C3, C4 and C5, there are four shifts and four partial results. The third and fourth partial results are 123 and 124, respectively.

The partial results 121-124 are then added which produces the outcome AC3+BC4+CC5, using only half the physical area that the conventional multiplier/adder in FIG. 4(a) requires.

DCT/IDCT BLOCK CONFIGURATION

Referring again to FIG. 1, taking advantage of the symmetrical/antisymmetrical properties of the DCT/IDCT and the advantage of interleaved transposition memory 60 an extremely efficient DCT/IDCT integrated circuit 10 is designed. The pre-registers and ALU (arithmetic logic unit) 30 store incoming data, from either the data input port of the processor 20 (for the first dimension) or from the RAM 60 (for the second dimension), and performs the necessary calculations before multiplications. The multiplier and accumulator 35 perform four multiplications and summations per internal clock pulse. The post-registers and ALU 40 store the intermediate DCT/IDCT results and perform required calculations after the multiplications. The post-registers and ALU 40 also output temporary results to the RAM 60 (after the first dimension) or the final results off of the device 10 (after the second dimension).

The data flow of DCT and IDCT will now be described. During the first pass of DCT (or first dimension as it was referred to above), data enters the device 10 in row order. Each of the eight input values are temporarily stored in the pre-registers 30. Taking advantage of the symmetrical/antisymmetrical property of DCT coefficients, addition on each even row and subtraction on each odd row is performed on the incoming data (in ALU 30), thus reducing the number of required multiplications. The added values are multiplied by the internal cosine coefficients and then stored in a row of the interleaved RAM 60.

During the second pass (or second dimension as referred to above) of DCT, data is read from columns of the interleaved RAM 60 and multiplied by the multipliers 35 after being pre-processed by the ALU 30 (same as during the first pass). Final results from the multipliers 35 are output from the device 10. In the same input data clock pulse, new data enters the device 10 for the first pass of DCT, and in interleaved clocks (as discussed with reference to FIG. 2) the data flows t through the device 10 as described above for the first pass and is stored in columns, replacing the previous stored data in columns as the data is retrieved for the second pass of the DCT. In effect, a "row" for one set of data corresponds to a "column" for preceding data.

In IDCT, on the other hand, during the first pass of the IDCT, data enters the device 10 in columns order. Each of the eight input values are temporarily stored in the pre-registers 30. Taking advantage of the symmetrical/antisymmetrical property of IDCT columns, multiplications by the internal cosine coefficients are performed (in multiplier 35), and the results of summations and subtractions of partial products, performed in ALU 40, are stored on the interleaved RAM 60.

During the second pass of IDCT, data is read from the interleaved RAM 60 and multiplied by the multipliers 35. The multiplied results are again processed by the ALU 40 (same as during the first pass of IDCT) in order to generate final results, which leave the device 10. In the same input clock pulse, new data enters the device 10 for the first pass of IDCT, and in interleaved clocks, the new data flows through the device 10 as described above for the first pass.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A discrete cosine transform/inverse digital cosine transform (DCT/IDCT) integrated circuit processor using a single random access memory and capable of performing two pass DCT and IDCT, comprising
    an input buffer for receiving data,
    a first arithmetic logic unit connected to said input buffer for receiving and processing groups of incoming data for minimizing subsequent multiplications of the data by DCT coefficients,
    a multiplier/accumulator having stored DCT/IDCT coefficients and connected to said first arithmetic logic unit for receiving and multiplying groups of data from said first arithmetic logic by said DCT/IDCT coefficients in first and second passes through said multiplier/accumulator,
    an output buffer connected to said multiplier/accumulator for receiving said groups of data after multiplication in first and second passes by said multiplier/accumulator,
    a second arithmetic logic unit connected to said output buffer for processing groups of data for IDCT output, for minimizing previous multiplications of the data by IDCT coefficients,
    a random access memory for receiving and storing data in rows and in columns, and
    bus means for transferring data from said output buffer and from said second arithmetic logic unit to said random access memory for storage in a row or a column after a first pass through said multiplier/accumulator and for transferring data in a column or a row to said input buffer and first arithmetic logic unit for a second pass through said multiplier/accumulator.

2. The discrete cosine transform/inverse digital cosine transform (DCT/IDCT) integrated circuit processor as defined by claim 1 wherein for first pass DCT said first arithmetic logic unit adds data values symmetrically for even rows (D0+D7, D1+D6, D2+D5, D3+D4) and subtracts data values symmetrically for odd rows (D0-D7, D1-D6, D2-D5, D3-D4).

3. The discrete cosine transform/inverse digital cosine transform (DCT/IDCT) integrated circuit processor as defined by claim 1 wherein for first pass IDCT said first logic unit provides even data values (D0, D2, D4, D6) to said multiplier/accumulator for four multiplications by even coefficients and then summed (S0), and provides odd data values (D1, D3, D5, D7) to said multiplier/accumulator for four multiplications by odd coefficients and then summed (S1), the summation of S0 and S1 giving a first result (F0) and the substration of S0 and S1 giving a last result (F7) of IDCT coefficients multiplied by data values.

4. The discrete cosine transform/inverse digital cosine transform (DCT/IDCT) integrated circuit processor as defined by claim 1 wherein said multiplier/accumulator comprises partial product means for obtaining partial products of a plurality of numbers added to a plurality of least significant bits of coefficients and then summed, said partial product means repeating the obtaining of partial products of said plurality of numbers and a plurality of next least significant bits of said coefficients and then summed, and summing means connected to said partial product means for summing said partial products.

5. The discrete cosine transform/inverse digital cosine transform (DCT/IDCT) integrated circuit processor as defined by claim 1 wherein said processor operates at twice the speed of the input data, new data being stored in rows or columns of said memory as old data is read as readout of said memory in columns or rows whereby rows and columns are exchanged in position in succeeding passes.

* * * * *